July 12, 1932.   W. E. ANDERS   1,867,486
SPRING SHACKLE
Filed Aug. 22, 1929
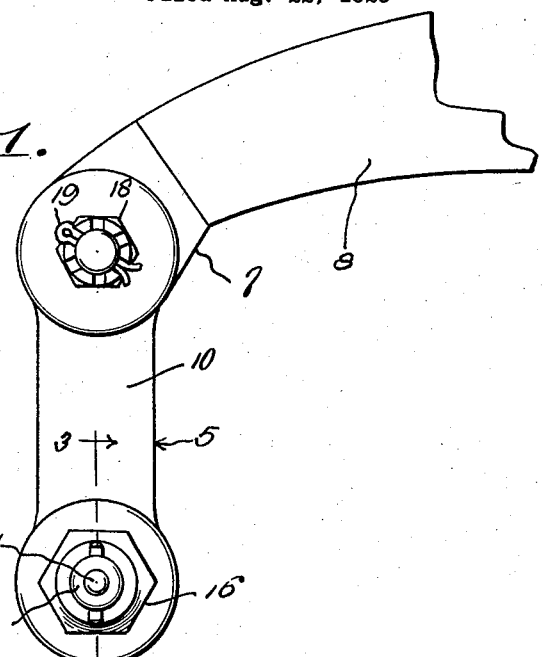
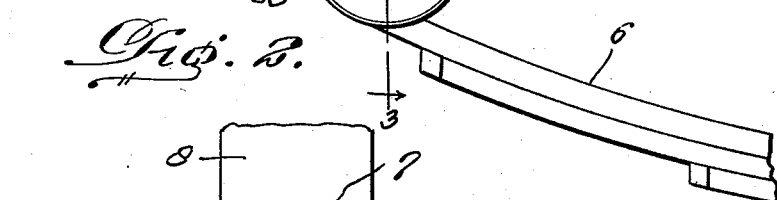
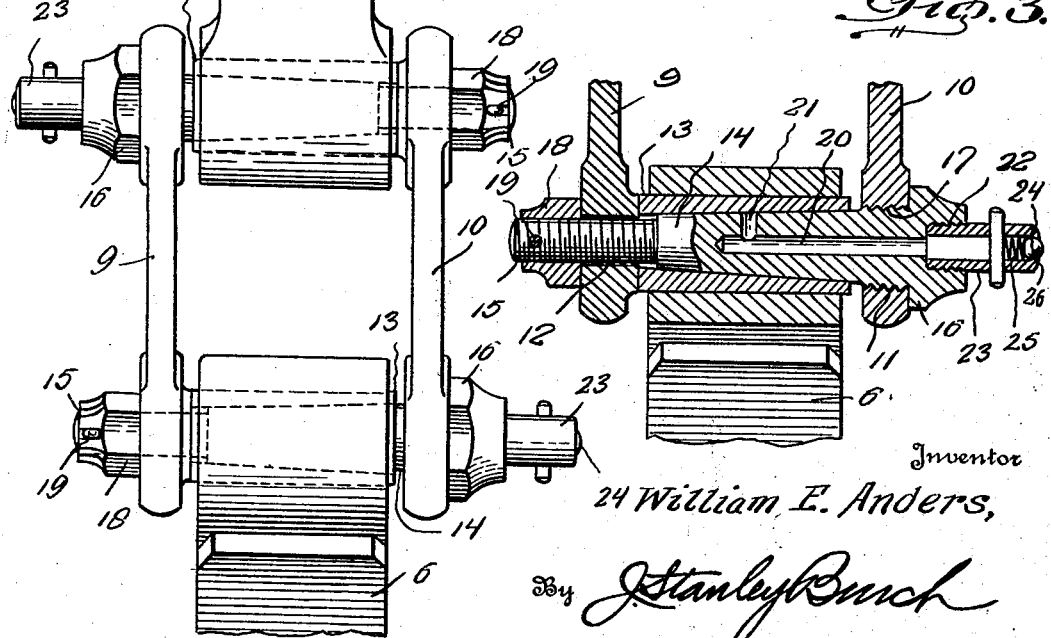
Inventor
William E. Anders,
By J. Stanley Burch
Attorney Patented July 12, 1932

1,867,486

UNITED STATES PATENT OFFICE

WILLIAM ERNEST ANDERS, OF WEST ASHEVILLE, NORTH CAROLINA, ASSIGNOR OF TWO-FIFTHS TO GLADYS CURTIS ANDERS, OF MIAMA, FLORIDA

SPRING SHACKLE

Application filed August 22, 1929. Serial No. 387,682.

This invention relates to an improved spring shackle having lubricating means, and has among its objects the provision of a device of this character wherein the parts may be readily adjusted to take up radial wear, and whereby tapered bearing surfaces are provided between the pivot bolts of the shackle and the bearing bushings of the members which the shackle connects.

A more particular object is to provide an improved shackle bolt and bearing bushing having coacting tapered surfaces, and means for adjusting the bolt axially of the bearing bushing for simultaneously taking up radial and axial play between the bolt and bushing and consequently between the parts connected by the shackle of which the bolt and bearing bushing form parts.

The invention consists in the novel form, combination and arrangement of parts hereinafter more fully described, shown in the accompanying drawing and claimed.

Referring to the drawing:

Figure 1 is a side elevational view of a shackle embodying the present invention, and illustrating the same applied for connecting an end of a spring to the end of a vehicle frame.

Figure 2 is an end elevational view of the structure shown in Figure 1; and

Figure 3 is a fragmentary vertical section taken substantially upon line 3—3 of Figure 1.

In the embodiment of the invention illustrated, the shackle 5 is shown as supporting one end of a leaf spring 6 from a bracket 7 carried by the side rail 8 of a vehicle frame. However, it will be readily understood that the structure may be adapted for connecting adjacent ends of two leaf springs, if desired.

The shackle 5 comprises a pair of oppositely positioned side members or links 9 and 10, each of which is provided at one end with a relatively large threaded opening 11 and at its opposite end with a smaller unthreaded opening 12, the threaded opening 11 of one member or link being alined with the unthreaded opening 12 of the other member or link as clearly illustrated with respect to the lower ends of the links 9 and 10 in Figure 3. In this way the links are interchangeable for use at either side of the structure.

The bracket 7 and spring 6 are formed with corresponding eyes of cylindrical form in which are tightly fitted bearing bushings 13 having cylindrical outer surfaces and inner surfaces which gradually taper from one end of each bushing to the other.

A shackle bolt of special form is extended through the alined openings in the side members or links 9 and 10 and the bushing 13 of bracket 7 to pivotally connect said members or links 9 and 10 to said bracket, while a similar shackle bolt is extended through the alined openings in the lower ends of the links 9 and 10 to connect the latter to the end of the spring 6, the latter bolt extending through the bushing 13 of said spring and the bolts being inserted from opposite sides of the structure, as will be apparent. As the pivotal connection and shackle bolt construction at each point is the same, illustration and specific description of one will suffice for both.

As shown, each shackle bolt is provided with a smooth tapered intermediate shank portion 14 having a reduced threaded extension 15 at its smaller end and a polygonal head 16 at its larger end, the end of the tapered portion 14 immediately adjacent and at the inner side of the head 16 being threaded as at 17. The threaded portion 17 of the bolt shank is adapted to be threaded into the opening 11 of one link and the smooth tapered portion is adapted to fit within the taperd bore of the adjacent bushing 13, while the reduced threaded extension 15 is adapted to freely extend through the opening 12 of the other link or side member of the shackle. A nut 18 is then applied to the projecting end of the extension 15 to hold the parts assembled, any suitable means being provided as at 19 to lock the nut 18 in adjusted position. It will be observed that by adjusting the nut 18 the parts may be drawn together so as to secure intimate contact between the outer surface of the tapered portion 14 of the bolt shank and the inner tapered surface of the associated bushing 13, whereby effectively preventing any axial or radial play. Moreover, when any such play takes place due to wear of the parts after continued use, the nut 18 may be duly adjusted so as to shift the tapered portion 14 of the shackle bolt axially of the associated bushing 13 and thus take up the play. As illustrated in Figure 3, the bushing 13 is slightly longer than the terminal eye of the spring, to project beyond the ends of the latter, and thereby provide an abutment for the adjacent end of the link 9 having the small unthreaded opening 12, through which the reduced threaded extremity of the bolt lies. Consequently, when the nut 18 is adjusted to compensate for wear of the parts, there is no relative movement between the link 9 and the bushing 13, and the small reduced end of the bolt is relieved of any undue strain.

Each shackle bolt is provided with a longitudinal disposed lubricating passage 20 opening on the surface of the smooth shank portion 14 at 21, and this passage 20, at the head end of the bolt, is enlarged as at 22. In the enlargement 22 is secured or threaded an end of the casing of a lubricating connection 23. This lubricating connection is in the form of a tubular casing or sleeve housing a spherical check valve 24 and spring 25 yieldingly pressing the valve against the inturned portion 26 of the casing which provides a seat for the valve 24.

As will be understood by those skilled in the art, the head 16 is of polygonal form for engagement by a wrench so that the bolt may be threaded into the opening 11 of the adjacent shackle link or side shackle member. The manner of using the lubricating connection 23 is well known in the art and clearly described in the United States Letters Patent to Arthur V. Gullborg, No. 1,404,758, dated January 21, 1922.

While the construction shown in the drawing has been described with considerable particularity in order to make the construction and operation of the same clear to those skilled in the art, it is to be understood that the invention is not limited to the precise details of construction shown and described, except as limited by the appended claim.

What I claim as new is:

A shackle for vehicle springs having an eye terminal, including a pair of spaced links having a relatively large threaded opening and a smaller unthreaded opening alined at the opposite ends of the eye terminal of the spring, a bushing fitted tightly in said eye terminal and having its inner surface tapered from one end to the other, and projecting beyond the ends of said eye terminal to constitute an abutment for one of said links, a shackle bolt having a tapered intermediate portion of a length equal to that of said bushing, a threaded portion received by said enlarged threaded opening of one of the links, and a reduced threaded extremity slidable through said small unthreaded opening, and a nut on said reduced extremity.

In testimony whereof I affix my signature.

WILLIAM ERNEST ANDERS.